US012749209B2

(12) United States Patent
Horie et al.

(10) Patent No.: US 12,749,209 B2
(45) Date of Patent: Sep. 29, 2026

(54) LIQUID EJECTION HEAD AND LIQUID EJECTION APPARATUS INCLUDING THE SAME

(71) Applicant: CANON KABUSHIKI KAISHA, Tokyo (JP)

(72) Inventors: Asuka Horie, Kanagawa (JP); Tomohiro Takahashi, Kanagawa (JP); Takayuki Ono, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 291 days.

(21) Appl. No.: 18/526,256

(22) Filed: Dec. 1, 2023

(65) Prior Publication Data

US 2024/0095940 A1 Mar. 21, 2024

(30) Foreign Application Priority Data

Dec. 2, 2022 (JP) ................................ 2022-193616

(51) Int. Cl.

*G06T 7/55* (2017.01)
*B25J 9/00* (2006.01)
(Continued)

(52) U.S. Cl.

CPC ............... *G06T 7/55* (2017.01); *B25J 9/0093* (2013.01); *B25J 9/1697* (2013.01); *B65G 59/02* (2013.01);
(Continued)

(58) Field of Classification Search

CPC ............... B41J 2202/14; B41J 2/14201; B41J 2/14024; B41J 2/02; B41J 2/14; B41J 2/145; B41J 2202/01; G06T 7/55; G06T 5/50; G06T 7/50; G06T 7/593; B25J 9/0093; B25J 9/1697; B65G 59/02; B65G 67/04; B65G 67/24

See application file for complete search history.

(56) References Cited

U.S. PATENT DOCUMENTS 6,293,652 B1 9/2001 Arashima et al.
8,757,773 B2 * 6/2014 Shinoda .................. B41J 2/155 347/42

(Continued)

FOREIGN PATENT DOCUMENTS

CA 2 214 312 C 5/2003
CN 102205716 A 10/2011

(Continued)

OTHER PUBLICATIONS

Office Action dated Jun. 19, 2026, in Chinese Patent Application No. 202311606886.X.

*Primary Examiner* — Patrick H Mackey
(74) *Attorney, Agent, or Firm* — Venable LLP

(57) ABSTRACT

To assemble a positioning member, which is to come into abutment with a liquid ejection apparatus, to a liquid ejection member, adjustment parts for adjusting positions of the positioning member and the liquid ejection member and securing parts for coupling and securing the positioning member and the liquid ejection member are provided to couple and secure the positioning member and the liquid ejection member. Thus, the positions of ejection ports of the liquid ejection head set in the liquid ejection apparatus and reference positions can be positioned with high accuracy.

11 Claims, 12 Drawing Sheets

(51) Int. Cl.

| | |
|---|---|
| ***B25J 9/16*** | (2006.01) |
| ***B65G 59/02*** | (2006.01) |
| ***B65G 67/04*** | (2006.01) |
| ***B65G 67/24*** | (2006.01) |
| ***G06T 5/50*** | (2006.01) |
| ***G06T 7/50*** | (2017.01) |
| ***G06T 7/593*** | (2017.01) |

(52) U.S. Cl.
CPC ............. *B65G 67/04* (2013.01); *B65G 67/24* (2013.01); *G06T 5/50* (2013.01); *G06T 7/50* (2017.01); *G06T 7/593* (2017.01); *B65G 2201/0235* (2013.01); *B65G 2814/0311* (2013.01); *G06T 2207/10028* (2013.01)

(56) References Cited

U.S. PATENT DOCUMENTS

| | | | | |
|---|---|---|---|---|
| 9,233,534 | B2 * | 1/2016 | Koga | B41J 2/14 |
| 9,259,931 | B2 * | 2/2016 | Moreau | B41J 2/04505 |
| 9,796,196 | B2 | 10/2017 | Hamano | |
| 9,802,409 | B2 * | 10/2017 | Yamabe | B41J 2/145 |
| 10,343,411 | B2 * | 7/2019 | Midorikawa | B41J 2/14209 |
| 11,142,008 | B2 * | 10/2021 | Tatsuta | B41J 25/34 |
| 2011/0221822 | A1 | 9/2011 | Hagiwara et al. | |
| 2015/0202867 | A1 | 7/2015 | Koga et al. | |
| 2021/0206168 | A1 | 7/2021 | Raymond et al. | |

FOREIGN PATENT DOCUMENTS

| | | | | | |
|---|---|---|---|---|---|
| CN | 107009766 | A | | 8/2017 | |
| JP | 2011-031606 | A | | 2/2011 | |
| KR | 20120100188 | A | * | 9/2012 | B41J 2/145 |

* cited by examiner

LIQUID EJECTION HEAD AND LIQUID EJECTION APPARATUS INCLUDING THE SAME

BACKGROUND OF THE INVENTION

Field of the Invention

The present disclosure relates to a liquid ejection head that ejects liquid and a liquid ejection apparatus including the same.

Description of the Related Art

In mounting an inkjet printhead, which is a typical liquid ejection head that ejects liquid (hereinafter also referred to as a "printhead"), to an inkjet printing apparatus (hereinafter also referred to as a "printing apparatus"), positioning for the attachment needs to be accurate. For this reason, a printhead is provided with positioning portions used for positioning relative to a printing apparatus in terms of a conveyance direction in which a medium to be printed such as paper is conveyed (an X-direction), a direction which is along the surface of the medium to be printed and is orthogonal to the conveyance direction (a Y-direction), and a direction perpendicular to the surface of the medium to be printed (a Z-direction). The Z-direction is parallel to a liquid ejection direction.

In methods employed for conventional printheads, positioning is performed between an ink ejection member and a positioning member so that the positions of ejection ports that eject ink relative to the positioning portions fall within a predetermined accuracy, and then an adhesive is used to secure them. Also, as described in Japanese Patent Laid-Open No. 2011-31606 (hereinafter referred to as Literature 1), with a printhead being temporarily secured to a positioning member secured to a jig, positional adjustments are made by movement in the X- and Y-directions, and the positioning member and the printhead are secured with a UV adhesive.

Using an adhesive to secure a positioning member to a printhead as described in the related art poses a concern where after the positioning, positional displacement may occur due to, e.g., contraction of the adhesive in curing or contraction of a member caused by heating performed in a case where a thermosetting adhesive is used. It is particularly difficult to position and secure a member accurately in a short period of time in a case where the member is complicated in shape, large, or relatively heavy.

Also, in a case of a printhead such that a positioning member is secured to the printhead using an adhesive, an external force applied to the positioning member in mounting of the printhead to a printing apparatus is transmitted to the adhesive, which makes it easy for deformation, peel-off, and the like to occur. For this reason, positional displacement may occur even after positioning is performed with the positioning member being secured to the printhead with an adhesive.

In a case of a full-line-type printhead in particular, because the printhead is elongated and large, a great force is needed to secure the printhead to the printing apparatus so that the printhead may be positioned accurately relative to the printing apparatus and secured not to move. This consequently makes it easy for positional shift to occur due to deformation of the adhesive, peel-off of the adhesive, and the like and increases the possibility of positional displacement of the printhead.

SUMMARY OF THE INVENTION

According to one aspect of the present invention, a liquid ejection head that ejects liquid includes a liquid ejection member having a print element board including an ejection port surface where ejection ports for ejecting liquid are formed and a plurality of print elements that generate energy for ejecting the liquid from the ejection ports; and a positioning member to serve as a positioning portion for the liquid ejection head and the liquid ejection apparatus horizontally and vertically upon mounting of the liquid ejection head to the liquid ejection apparatus. The liquid ejection head has adjustment screws for adjusting the positions of the positioning member and the liquid ejection member and securing screws for coupling and securing the positioning member and the liquid ejection member, and the position of the positioning member is adjustable using the adjustment screws and the securing screws.

Further features of the present invention will become apparent from the following description of exemplary embodiments with reference to the attached drawings.

DESCRIPTION OF THE EMBODIMENTS

Embodiments of the present disclosure are described below with reference to the drawings.

The following descriptions use a printhead as a typical example of a liquid ejection head to which the present disclosure can be applied. However, the following descriptions are not intended to limit the scope of the present disclosure. Although the present embodiments use, as an example, the thermal method, in which liquid is ejected by generation of bubbles by heat generating elements, the present disclosure can be applied to a printhead employing any of the other various liquid ejection methods such as the piezoelectric method.

First Embodiment

<Printing Apparatus>

Figure 1A:
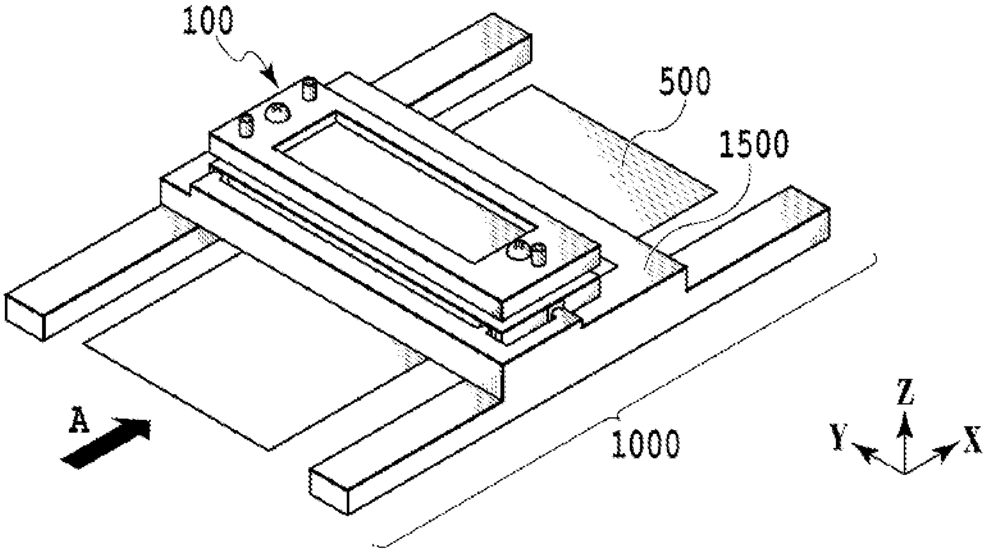
FIGS. 1A and 1B are perspective views of a printing apparatus 1000 to which the present disclosure can be applied.
Figure 1B:
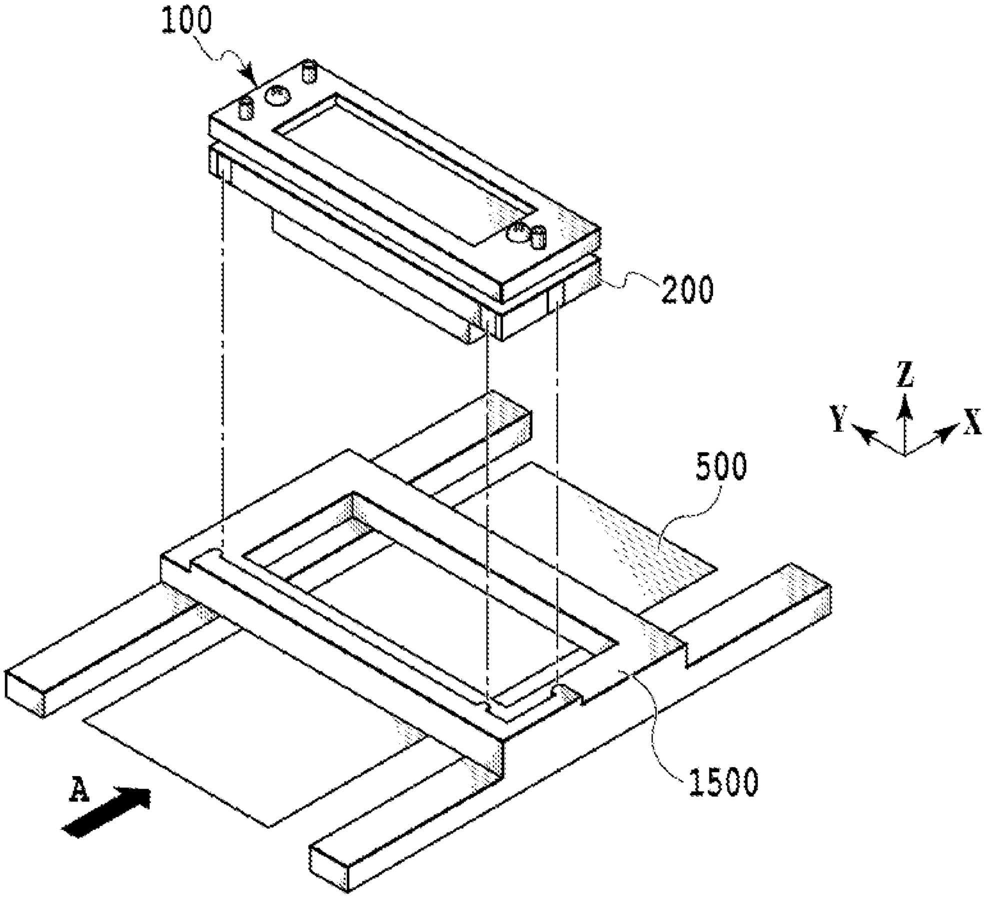

FIGS. 1A and 1B are perspective views of a printing apparatus 1000 to which the present disclosure can be applied. FIG. 1A is a diagram showing a state where a printhead 100 is mounted to the printing apparatus 1000. FIG. 1B shows a state before the printhead 100 is mounted.

The printhead 100 is provided with a positioning member 200. The positioning member 200 is provided with reference faces, namely, Y abutment faces 210, X abutment faces 211, and Z abutment faces 212, to serve as abutment references for mounting of the printhead 100 to the printing apparatus 1000.

The printhead 100 can be positioned relative to the printing apparatus 1000 by having the positioning member 200 of the printhead 100 biased toward a guide member 500 of the printing apparatus 1000 using a leaf spring (not shown), an abutment mechanism (not shown), or the like. As long as the positioning member 200 of the printhead 100 is properly attached to the printhead 100, there is no need to make positional adjustments after the printhead 100 is attached to the printing apparatus 1000. Thus, the positions of ejection ports can be reproduced even after repeated detachment and attachment of the printhead 100, and the quality of printed images can be maintained at high quality.

<Printhead>

Figure 2A:
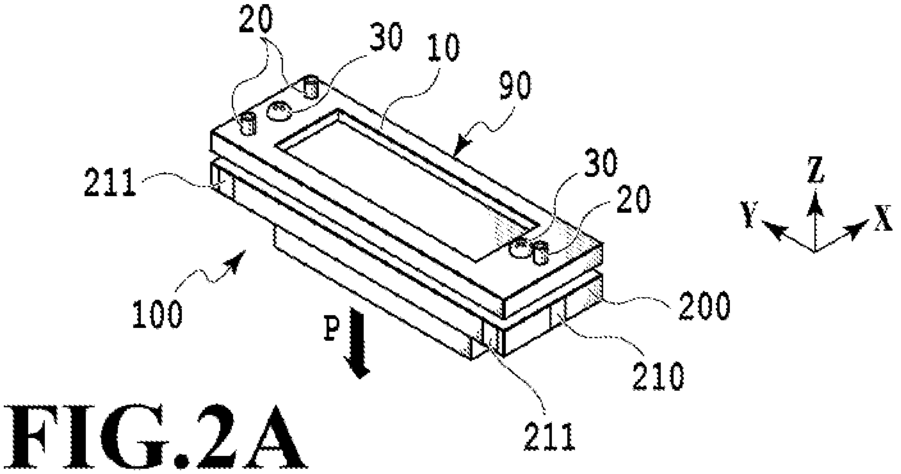
FIGS. 2A to 2C are diagrams of a printhead 100.
Figure 2B:
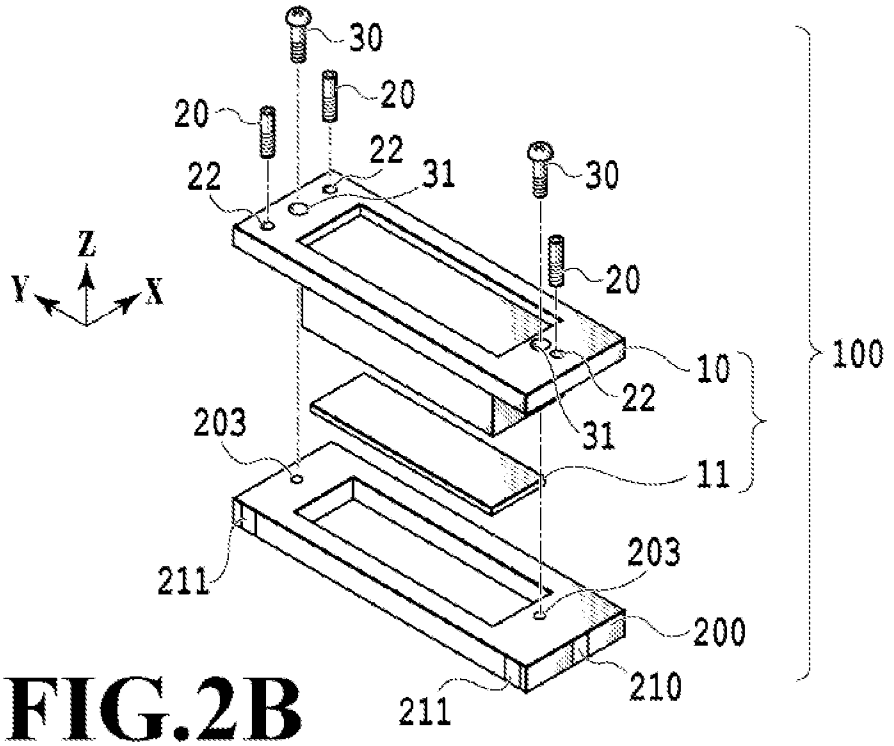
Figure 2C:
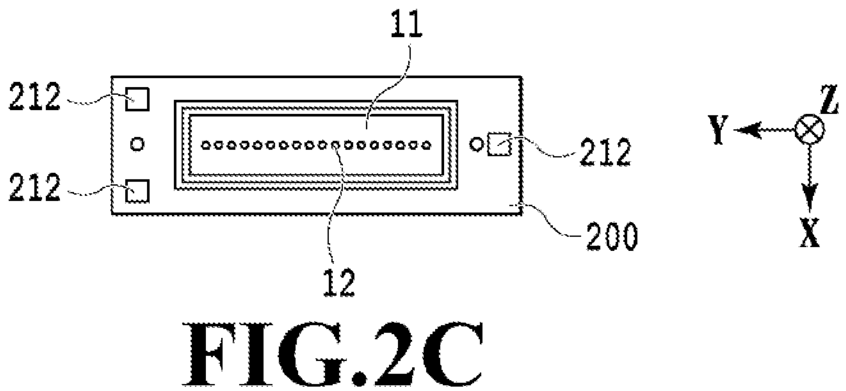

FIGS. 2A to 2C are diagrams of the printhead 100. FIG. 2A is a perspective view of the printhead, FIG. 2B is an exploded perspective view of the printhead, and FIG. 2C is a bottom view of the printhead 100. The printhead 100 has an ejection unit 90 for ejecting liquid and the positioning member 200 to serve as references for positioning of the printhead in the X- and Y-directions and the Z-direction.

The ejection unit 90 has a print element board 11 and a base member 10 including the print element board 11. As seen in FIG. 2C, ejection ports 12 for ejecting liquid are provided on the bottom surface of the print element board 11 disposed at the ejection unit 90. The ejection unit 90 further includes an electric wiring board (not shown) for electrically connecting the print element board 11 to the printing apparatus.

Flow channels (not shown) for supplying liquid to the print element board 11 are formed in the base member 10. The base member 10 is not limited to having an integral configuration, and may have a configuration such that a resin member where flow channels are formed is coupled to a support member made of metal to maintain rigidity. The base member 10 is further provided with tap holes 22 for attaching adjustment parts 20 (to be described later) and through-holes 31 for inserting securing parts 30.

In order to serve as abutment references in mounting of the printhead 100 to the printing apparatus 1000, the positioning member 200 has the following reference faces: the Y abutment faces 210, the X abutment faces 211, and the Z abutment faces 212. These reference faces include a convex shape as well to have a smaller area of contact with the printing apparatus 1000. The positioning member 200 is attached at a position so that the X- Y- and Z-positions of the ejection ports 12 of the print element board 11 may be optimal positions. This improves the accuracy of the positional relation between the printing apparatus 1000 and the ejection ports 12 in the mounting of the printhead 100 to the printing apparatus 1000, and consequently, print image quality improves. The positioning member 200 is provided with tap holes 203 for attaching the securing parts 30.

Figure 3A:
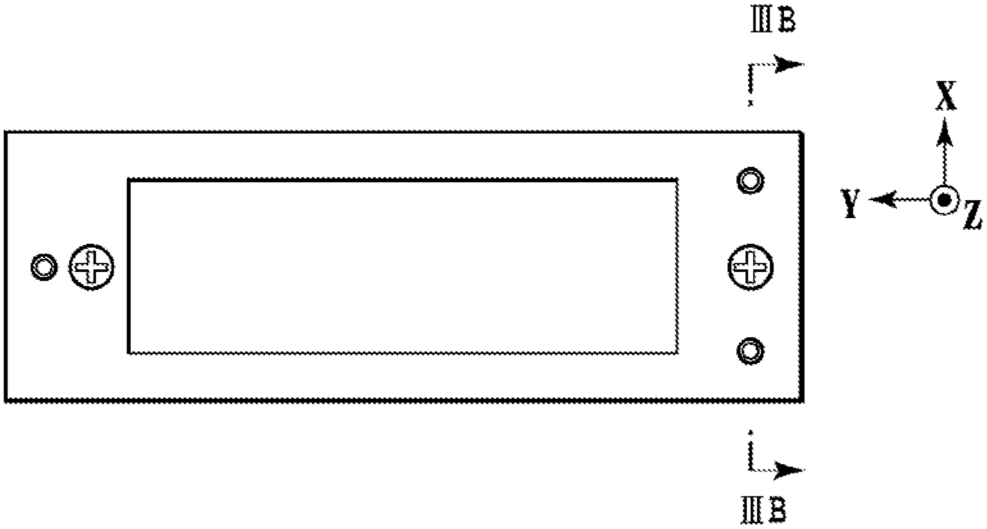
FIGS. 3A and 3B are diagrams of the printhead 100.
Figure 3B:
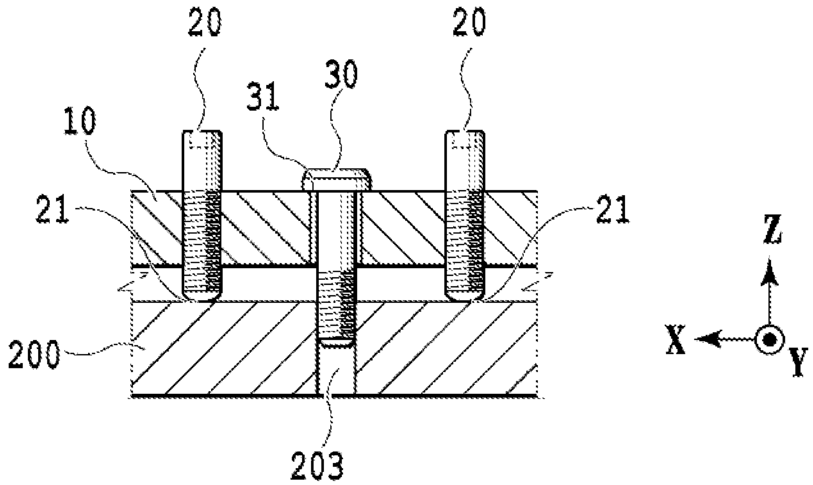

FIG. 3A is a top view of the printhead 100, and FIG. 3B is a sectional view showing a cross section IIIB-IIIB passing through the adjustment parts 20 and the securing part 30 in FIG. 3A.

As will be described later, the positioning member 200 is secured to the ejection unit 90 using the adjustment parts 20 and the securing parts 30.

The adjustment parts 20 define the distance between the positioning member 200 and the ejection unit 90 in the Z-direction (a distance in the ejection direction) at their optimal positions. For example, the adjustment parts 20 may be screws. Preferably, the adjustment parts 20 are screws with spherical tips. The screw-type adjustment parts (hereinafter also referred to as "adjustment screws") 20 may have, for example, slots, cross recesses, hexagon sockets, or the like formed at their screw heads so that the adjustment screws 20 can be fastened using a tool such as a screw driver or a hexagon wrench.

The adjustment screws 20 are inserted through the tap holes 22 opened in the base member 10, with their tips 21 being in contact with the positioning member 200. In a case where the tips 21 have spherical shapes, the contact states of the tips 21 are not changed by slanting of the positioning member 200. Moreover, in a case where a plurality of adjustment screws 20 are used, the adjustment screws 20 have equivalent areas of contact, and the plurality of adjustment parts 20 can come into contact with the positioning member 200 equally.

The securing parts 30 secure the ejection unit 90 to the positioning member 200. The securing parts 30 can secure the positioning member 200 to the base member 10 of the ejection unit 90 by passing through the through-holes 31 opened in the base member 10 and being fastened into the tap holes 203 opened in the positioning member 200.

The securing parts 30 may be screws. The screw-type securing parts (hereinafter also referred to as "securing screws") 30 have, for example, slots, cross recesses, hexagon sockets, or the like formed at their screw heads so that the securing screws 30 can be fastened using a tool such as a screw driver or a hexagon wrench. Also, securing parts 30 with spring washers or flat washers may be used.

Figure 4A:
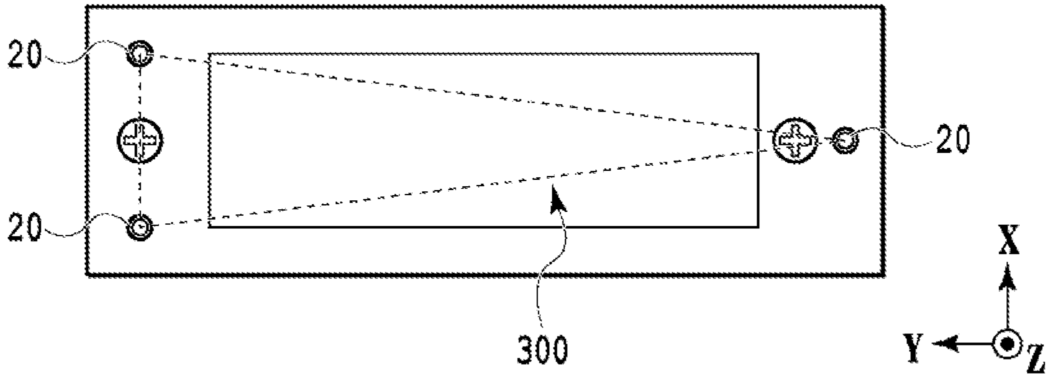
FIGS. 4A and 4B are top views of the printhead, illustrating the positions of screws on the printhead.
Figure 4B:
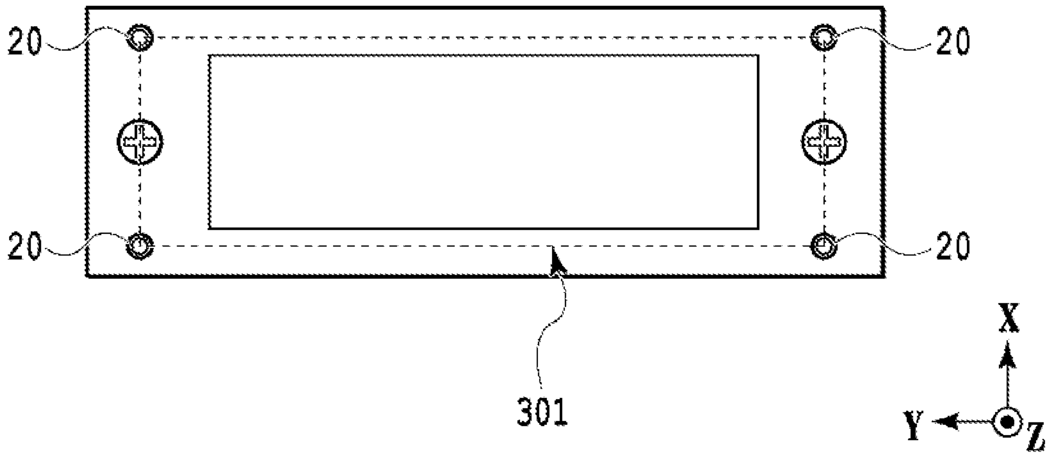

FIGS. 4A and 4B are top views of the printhead 100. FIG. 4A is an external view showing a case using three adjustment screws 20.

As seen in FIG. 4A, the securing screws 30 are desirably disposed on or inside of the sides of a polygon (i.e., a triangle in this case) 300 formed by lines connecting the three adjustment screws 20. In a case where the securing is done inside the triangle 300, a fastening force exerted by the securing screw 30 is transmitted to all three adjustment screws 20. Thus, such a force that raises the positioning member 200 is not exerted, causing the positioning member 200 not to be displaced by the fastening of the securing screws 30.

Meanwhile, in a case where the securing screws 30 are disposed outside of the triangle 300, a force exerted by fastening of the securing screw 30 produces such a force that raises the positioning member 200 with a line connecting two adjustment screws 20 acting as a rotation axis, and the positioning member 200 may be displaced.

There is no limitation as to the number of the adjustment screws as long as there are three or more of them. FIG. 4B shows a mode of a screw layout where four adjustment screws 20 are used. In a case where the positioning member 200 is large in size and having only three adjustment screws 20 would cause twisting or distortion of the head references, a configuration may be employed in which two adjustment screws 20 are disposed at each of the ends, and the securing screws 30 are disposed inside of a polygon 301 formed by the adjustment screws 20. In a preferable configuration, the securing screws 30 may be each disposed at a middle point between the two adjustment screws 20.

<How to Assemble the Printhead>

The following describes assemblage of the printhead 100. The positioning member 200 can be secured to the ejection unit 90 as follows. Positional adjustments are made so that the X-, Y-, and Z-positions of the ejection ports 12 and the X-, Y-, and Z-positions of the positioning member may be at proper positions, and height adjustments of the adjustment screws 20 are made. Then, the securing screws 30 are fastened to achieve securing while maintaining the high-accuracy positions.

Adjustment and assemblage are performed in the assemblage process of the printhead 100 as described below for example so that the positions to serve as the X-, Y-, and Z-references for the positioning member 200 may be at proper positions.

Figure 5:
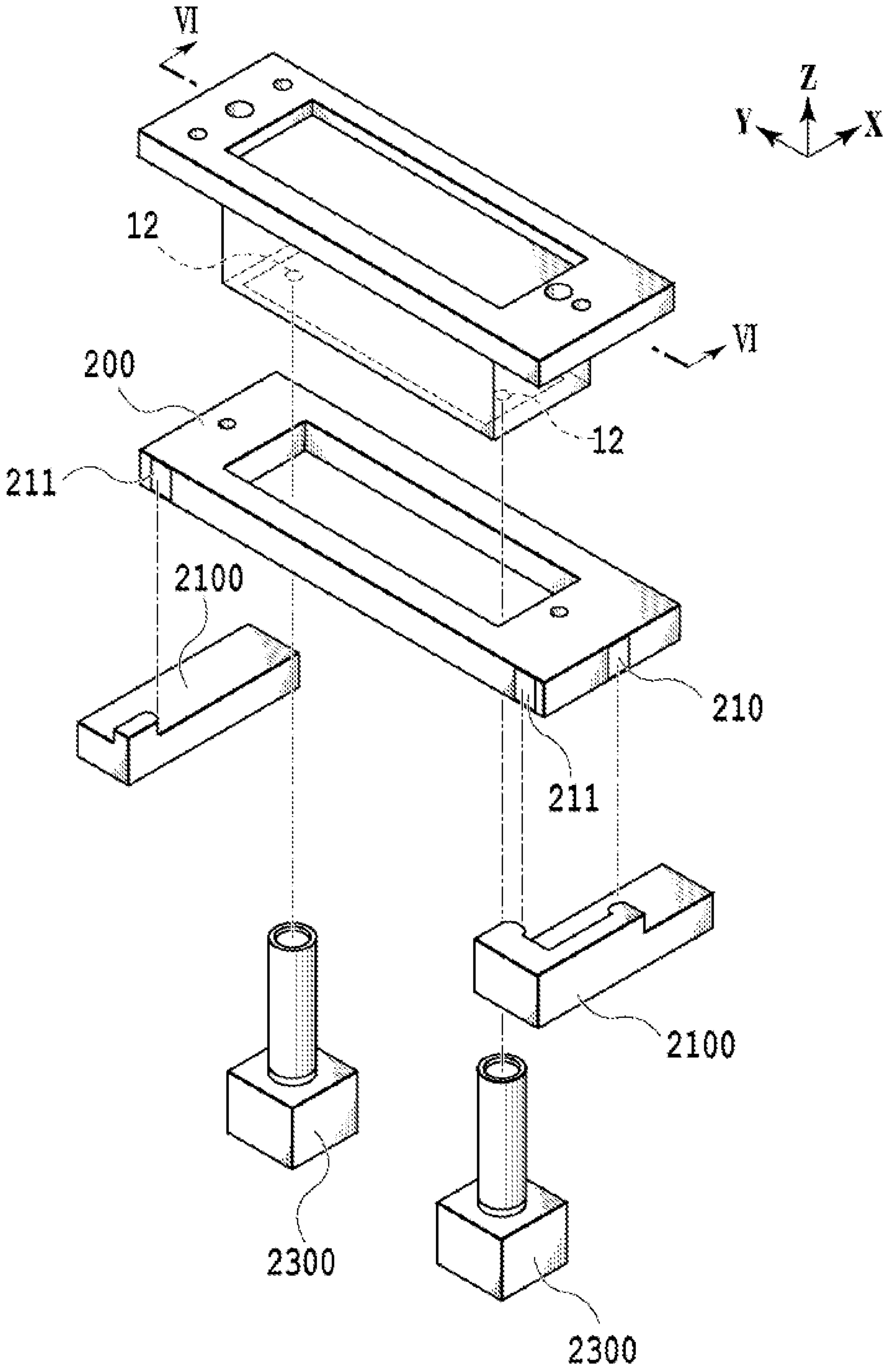
FIG. 5 is a perspective view illustrating how a positioning member is assembled to an ejection unit.

FIG. 5 is a perspective view showing the positional relation between the positioning member 200, the ejection unit 90, and (part of) an assemblage apparatus 2000.

The assemblage apparatus 2000 is equipped with cameras 2300 for imaging the positions of the ejection ports 12 of the print element board 11 disposed at the ejection unit 90.

Further, the assemblage apparatus 2000 has abutment references 2100 with which the position of the positioning member 200 is brought into abutment. The abutment references 2100 can determine the position of the positioning member 200. Note that the shapes of the abutment references 2100 are desirably equivalent to the shapes of the abutment references on the printing apparatus side for mounting of the printhead 100 to the printing apparatus 1000.

The positional relation between the target positions in the cameras 2300 and the abutment portions of the abutment references 2100 are adjusted in advance to be optimal values.

FIGS. 6A to 6F are sectional views showing an example of how the positioning member 200 is assembled using the assemblage apparatus 2000. FIGS. 6A to 6F omit depiction of X abutment portions of the abutment references 2100 of the assemblage apparatus 2000.

Figure 6A:
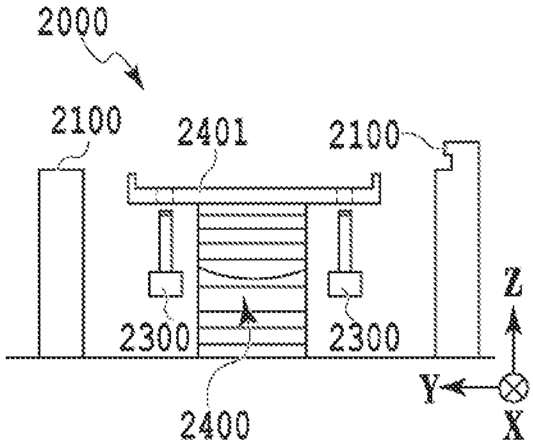
FIGS. 6A to 6F are side views illustrating how the positioning member is assembled to the ejection unit, with the printhead shown as a cross section taken in FIG. 5.

FIG. 6A shows the assemblage apparatus 2000 that assembles the positioning member 200 to the ejection unit 90. The assemblage apparatus 2000 has the cameras 2300 for detecting the position of the print element board 11, the abutment references 2100 that determine the abutment position of the positioning member 200, a movable stage 2400 capable of moving the ejection unit to given X-, Y-, and Z-positions, and a clamp jig 2401 that secures the printhead onto the movable stage 2400. Note that the abutment mechanism for biasing the positioning member 200 toward the abutment references 2100 is not shown.

Figure 6D:
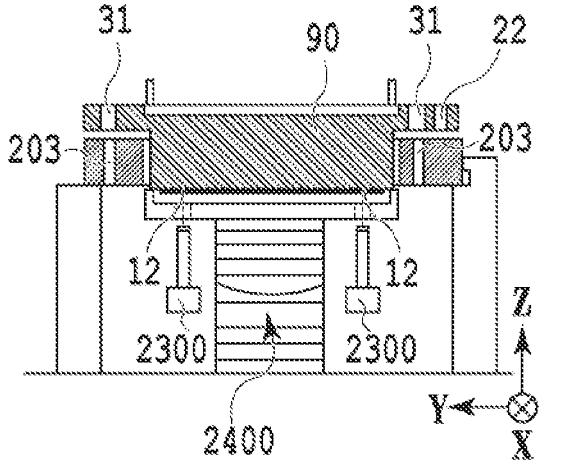
Figure 6B:
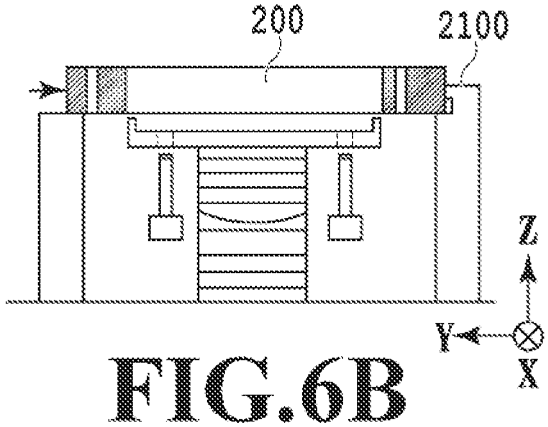

Next, as shown in FIG. 6B, the positioning member 200 is brought into abutment with the abutment references 2100 in the direction of the arrow, and the positioning member 200 is secured in position by biasing (not shown).

Figure 6E:
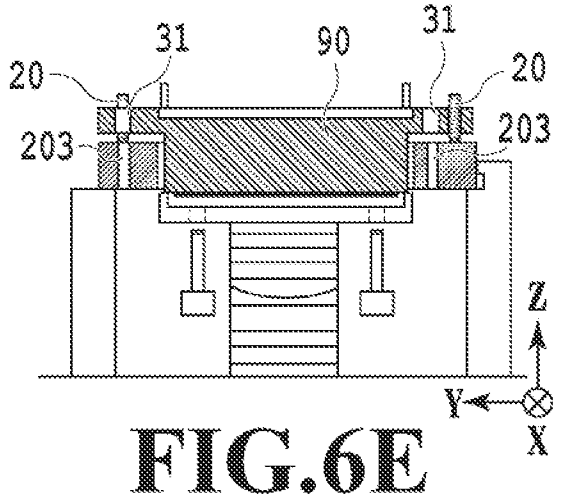
Figure 6C:
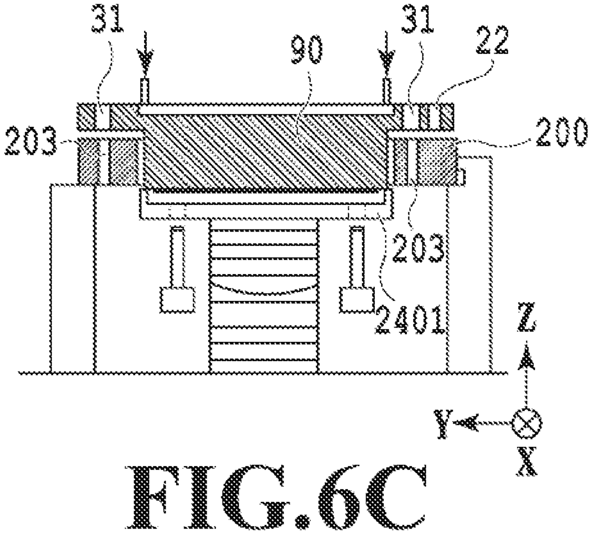

Next, as shown in FIG. 6C, the ejection unit 90 is mounted on the clamp jig 2401 and is secured by a clamp (not shown). In this state, the ejection unit 90 and the positioning member 200 are not touching each other.

Next, as shown in FIG. 6D, the cameras 2300 capture images of the ejection ports 12, and the movable stage 2400 moves the ejection unit 90 to bring the positions of the ejection ports 12 to the target positions in the cameras. In this event, autofocusing (AF) of the marks inside the cameras is simultaneously performed based on results of a contrasting density test or the like by moving the height of the ejection ports up and down with the stage, and thereby, the Z-direction position and X-direction and Y-direction positions are adjusted and moved to proper positions. AF can be replaced by a laser sensor or the like.

In this state, as shown in FIG. 6E, the adjustment screws 20 are fastened into the tap holes 22 in the ejection unit 90 until they come into abutment with the positioning member 200. As a result of this, the height interval between the positioning member 200 and the ejection unit 90 (a distance in the Z-direction) can be determined by the adjustment screws 20 at optimal positions.

Figure 6F:
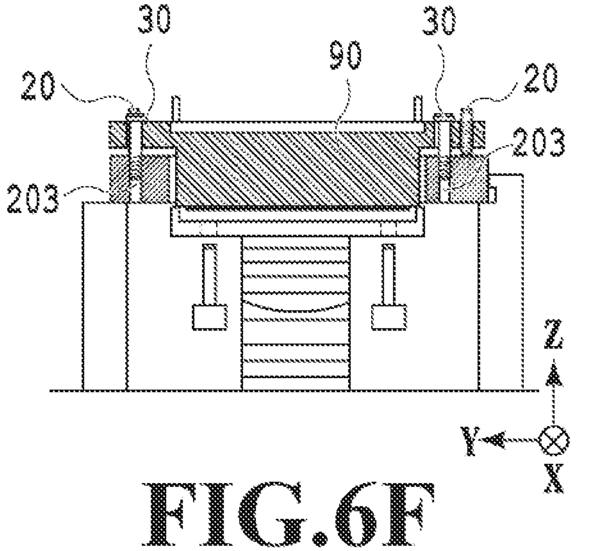

Next, in FIG. 6F, the securing screws 30 are fastened into the securing-screw tap holes 203 in the positioning member 200 through the securing-screw through-holes 31 in the ejection unit to couple and secure the ejection unit 90 and the positioning member 200 which are staying at the proper positions. In this event, the tips 21 of the adjustment screws 20 in contact with the positioning member 200 enter into the positioning member by a depth of approximately several micrometers, producing an anchoring effect against displacement of the positioning member in the X- and Y-directions and thus making displacement less likely. Then, the clamp is removed from the ejection unit 90, and the printhead 100 is taken out. As a result of the above, the ejection ports 12 can be adjusted in position at once in the X- and Y-directions and the Z-direction relative to the X-direction, Y-direction, and Z-direction reference positions included in the positioning member 200 and can be secured at optimal positions. For example, after the printhead 100 is mounted to the printing apparatus 1000, positioning and securing can be done so that the liquid ejection ports of the print element board 11 may be horizontal to the medium to be printed.

In this way, in the present embodiment, the positioning member 200 can be secured in position without interposition of an adhesive. In mounting of the printhead 100 to the printing apparatus 1000, loads are applied to the positioning member 200 and rigid parts such as the adjustment screws 20 and the securing screws 30, and consequently, a positional change due to, e.g., deformation of an adhesive or peel-off of an adhesive, does not occur. Not using an adhesive for the coupling eliminates the need for a heating step for curing a thermosetting adhesive and therefore does not induce deformation of the ejection unit 90 due to the heat in the heating step. Also, the assemblage can be done without a dwell time for curing.

Further, the positioning member 200 can be assembled in the final step of the assemblage process of the printhead 100. For this reason, the positioning member 200 can be adjusted and assembled with respect to the position of the print element board 11 in the final shape, without being affected by component tolerance and assemblage error that affect accuracy nor by inaccuracy due to thermal deformation caused by, e.g., heating performed to cure an adhesive at the time of assemblage. As a result, the assemblage can be done with higher positional accuracy.

In a case where there is a concern of loosening of screws due to shaking, vibration, and the like during transport of the printhead 100 or the printing apparatus 1000, loosening of the screws can be prevented by application of an anaerobic loosening-prevention adhesive to the thread portions of the adjustment screws 20 and the securing screws 30. Because the anaerobic loosening-prevention adhesive applied here cures not by heating or UV radiation but by reacting to metal ions with air being shut off, only the gaps between the thread lines are embedded, and the anaerobic loosening-prevention adhesive is not affected by inaccuracy caused by thermal deformation. Further, coupling between the positioning member 200 and the adjustment and securing screws 20, 30 and coupling between the ejection unit 90 and the adjustment and securing screws 20, 30 per se are done with the rigid parts being in contact with each other. Thus, even in a case where the positioning member 200 receives an external force, a positional change due to deformation of the loosening-prevention adhesive, peel-off of an adhesive, or the like do not occur.

Second Embodiment

In a second embodiment, the positioning member 200 is divided into a first positioning member 201 and a second positioning member 202 and disposed at the respective end portions of an ejection unit 92.

Figure 7A:
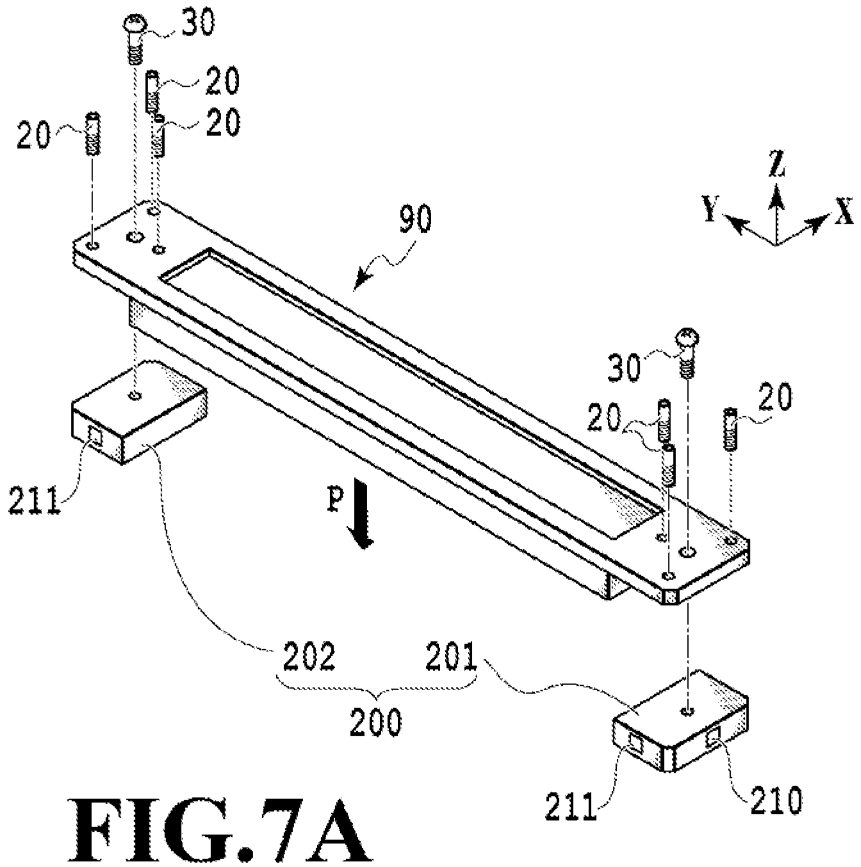
FIGS. 7A to 7C are diagrams illustrating a second embodiment.
Figure 7B:
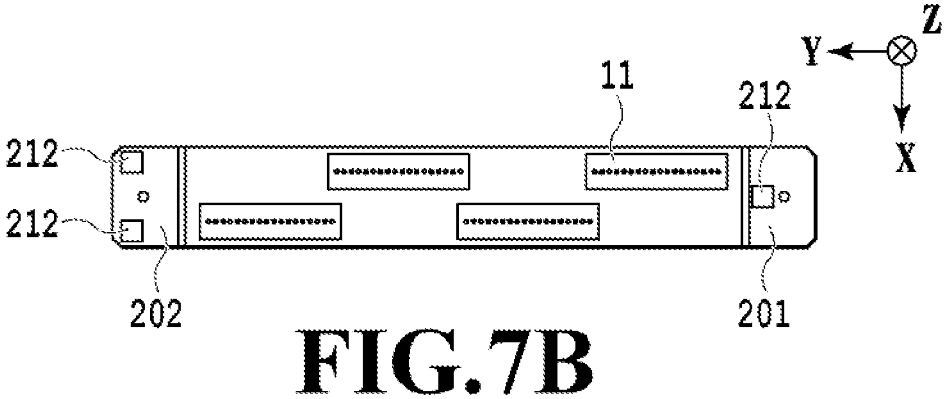
Figure 7C:

FIG. 7A is an exploded perspective view showing a state before attachment of the first positioning member 201 and the second positioning member 202. FIGS. 7B and 7C are a bottom view and a top view, respectively, where the first positioning member 201 and the second positioning member 202 are attached to the ejection unit 92. Positional adjustment and securing of the first positioning member 201 and the second positioning member 202 to the ejection unit 92 in the present embodiment are done using a method similar to the first embodiment and are therefore not described here.

The X-, Y-, and Z-reference positions of the printhead 120 are formed by both of the first positioning member 201 and the second positioning member 202. In the present embodiment, the Y abutment face 210 and the X abutment face 211 are formed at the first positioning member 201, and the X abutment face 211 is formed at the second positioning member 202 (see FIG. 7A). Also, as for the Z abutment faces 212, one Z abutment face 212 is formed at the first positioning member 201, and two Z abutment faces 212 are formed at the second positioning member 202 (see FIG. 7B).

Dividing the positioning member 200 into two members enables size reduction of the positioning member. Also, an element for twisting and warpage of the positioning member itself can be eliminated.

A printhead is elongated and large in a case where the printhead is a full-line-type printhead in which a plurality of print element boards 11 are arranged. Thus, great force is needed to secure such a printhead in order for the printhead to be accurately positioned relative to the printing apparatus and secured not to move. This consequently makes it likely to cause positional change due to deformation of an adhesive, peel-off of an adhesive, or the like and increases the possibility of positional displacement of the printhead. However, dividing the positioning member 200 into two members can reduce warpage of the positioning member and is therefore preferable.

Figure 8A:
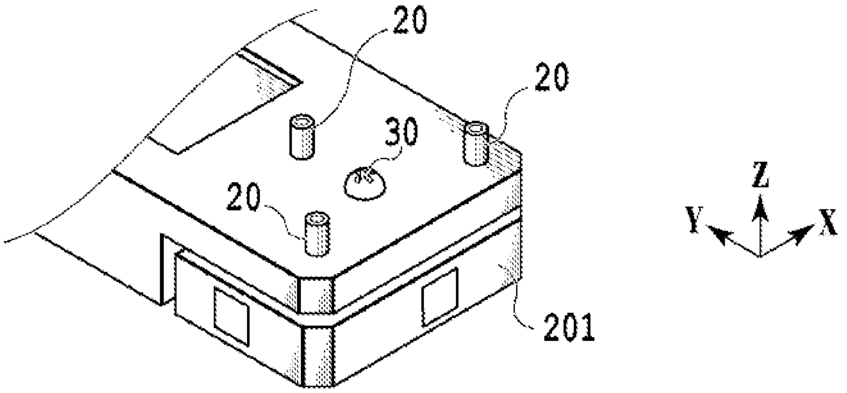
FIGS. 8A to 8C are diagrams of a printhead, showing an area around the positioning member in close-up to illustrate the positions of screws in the second embodiment.
Figure 8B:
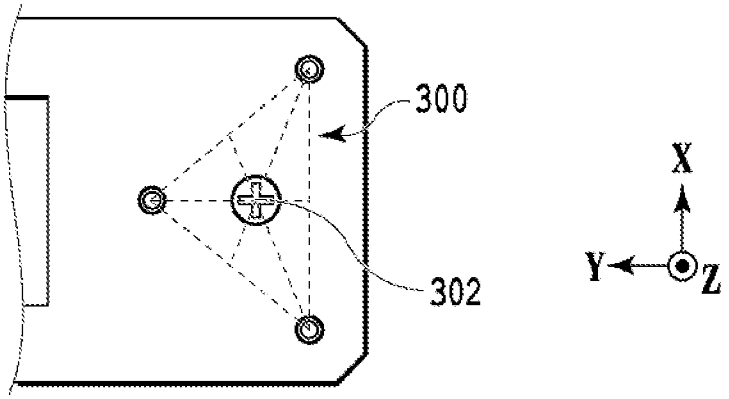
Figure 8C:
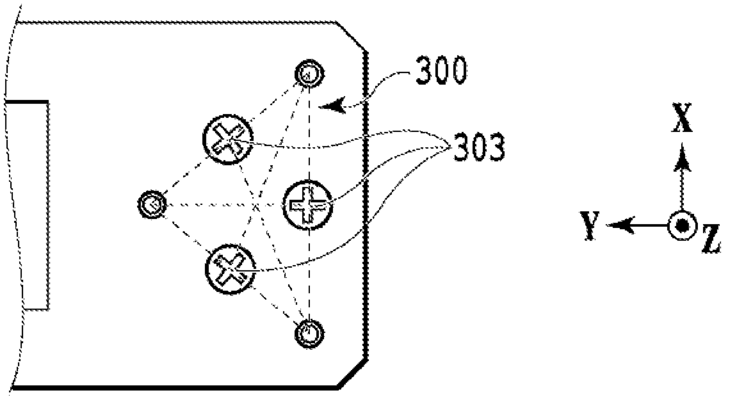

FIGS. 8A to 8C are diagrams showing the first positioning member 201 of the printhead 120 of the present embodiment in close-up. FIG. 8A is a perspective view of the first positioning member 201, FIG. 8B is a top view thereof, and FIG. 8C is a modification of the arrangement of the securing screws in FIG. 8B.

The securing screws 30 are preferably disposed inside of a polygon formed by connecting a plurality of adjustment screws, as in the first embodiment. Further, in a case where one securing screw is used for one positioning member with no ejection unit 92 or interferer inside the polygon formed by a plurality of adjustment screws as in FIGS. 8A and 8B, the securing screw is preferably disposed at a barycenter 302 of the polygon 300 formed by the adjustment screws 20. Then, upon fastening of the securing screws 30, loads are evenly applied to the plurality of adjustment screws 20, and the positioning member 200 and the ejection unit 92 can be secured with high accuracy without displacement at the time of fastening.

Also, in a case where the securing screws 30 are disposed at the middle points 303 of the respective sides of the polygon 300 formed by the adjustment screws 20 as in FIG. 8C, the positioning member 200 can be secured to the ejection unit 92 with increased securing force, while maintaining stable fastening.

Third Embodiment

A third embodiment relates to a printhead 130 such that the shape for positioning between a printhead 120 and the printing apparatus 1000 in the second embodiment is modified. In the present embodiment, a concave portion 250 formed at a first positioning member 231 of the printhead 130 and a groove portion 260 and a flat portion 270 formed at a second positioning member 232 of the printhead 130 are brought into abutment with spherical guide members 901 to enable positioning of the printhead in the X-, Y-, and Z-directions.

Positional adjustment and securing of the first positioning member 231 and the second positioning member 232 to an ejection unit 93 in the present embodiment are done using a method similar to the second embodiment and are therefore not described here.

Figure 9:
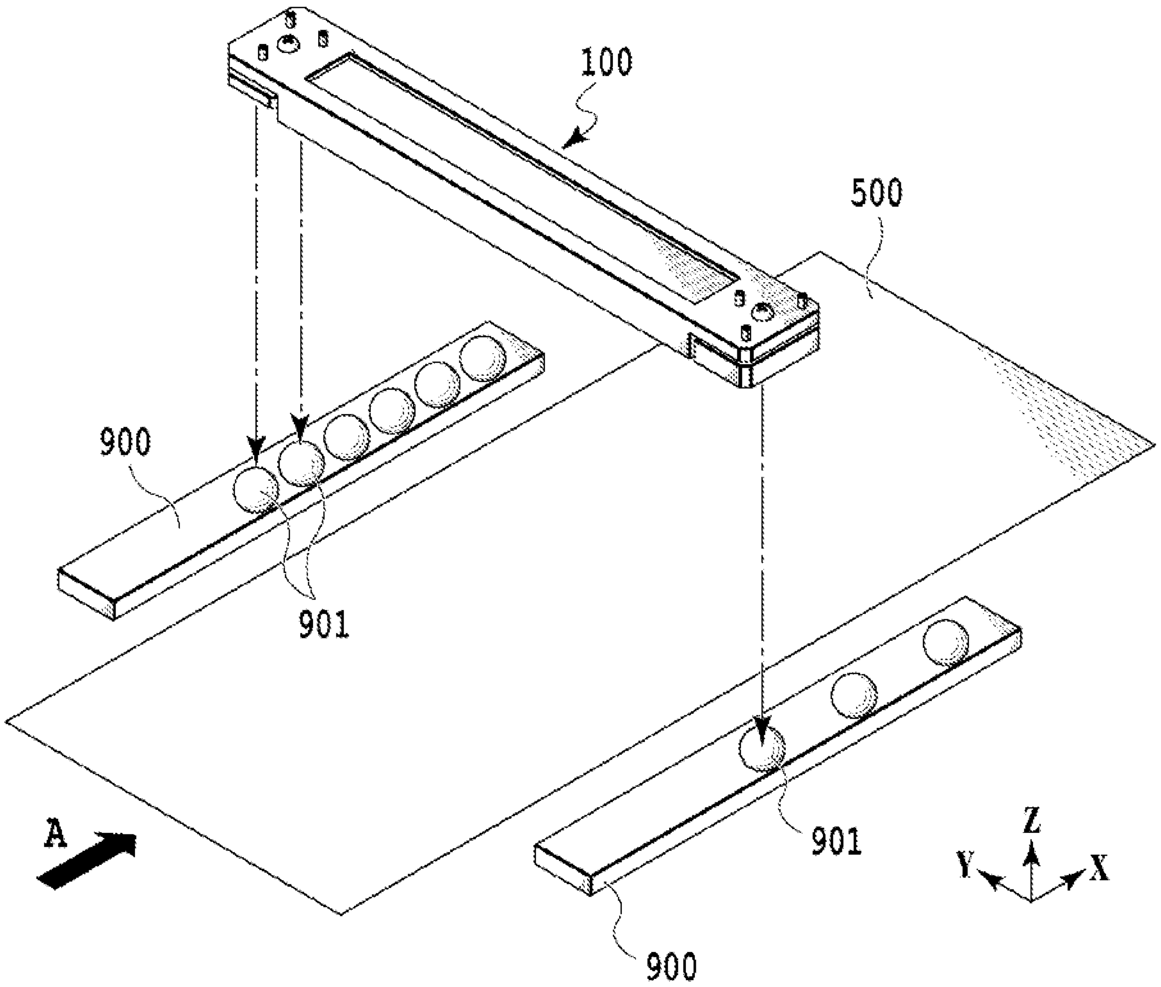
FIG. 9 is a diagram illustrating a third embodiment.

FIG. 9 is a perspective view of a printing apparatus 1300 before the printhead 130 of the third embodiment is mounted. The printhead 130 abuts against the spherical guide members 901 disposed at head support spaces 900 of the printing apparatus 1300.

Figure 10A:
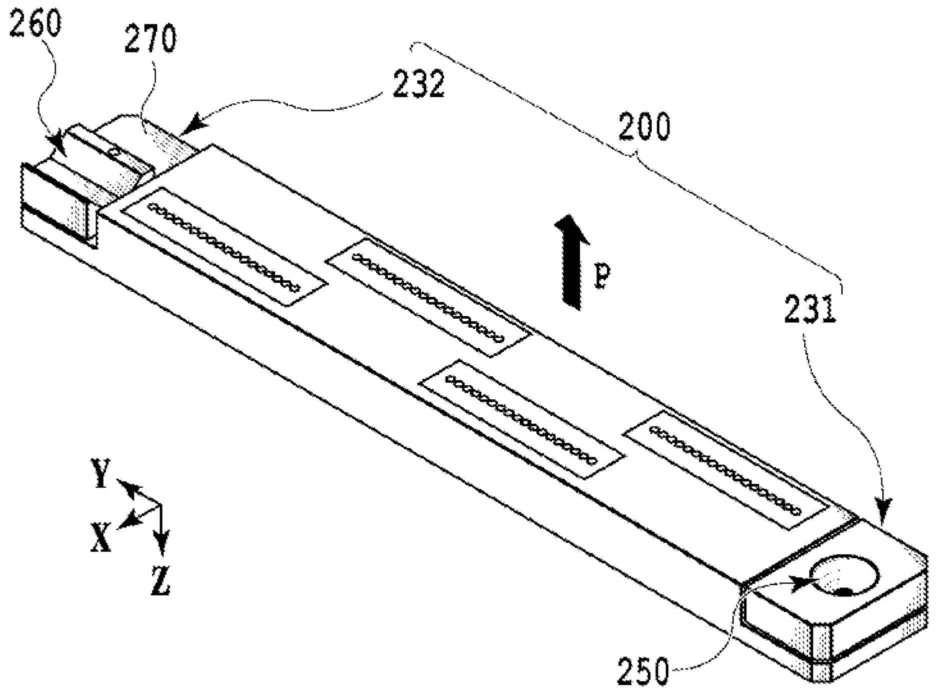
FIGS. 10A and 10B are diagrams showing a printhead 130 of the third embodiment.
Figure 10B:
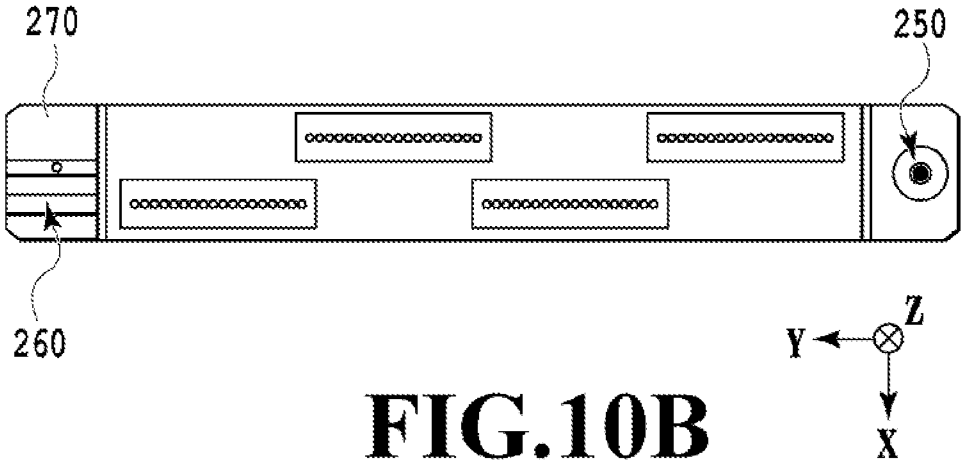

FIGS. 10A and 10B show the printhead 130 of the third embodiment. FIG. 10A is a perspective view with the ejection ports 12 on the upper surface, and FIG. 10B is a top view of the printhead in FIG. 10A.

The printhead 130 is set in the printing apparatus 1300 with the ejection ports 12 facing downward in the Z-axis direction, as in FIG. 9.

Figure 11A:
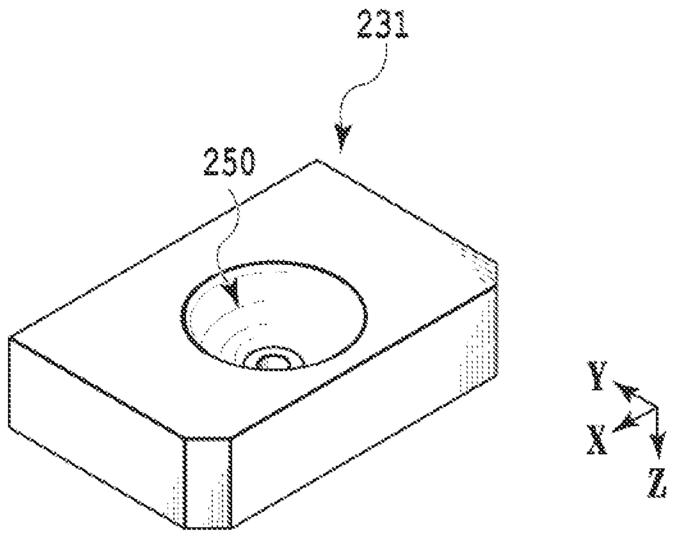
FIGS. 11A to 11C are diagrams of a first positioning member 231, illustrating the third embodiment.
Figure 11B:
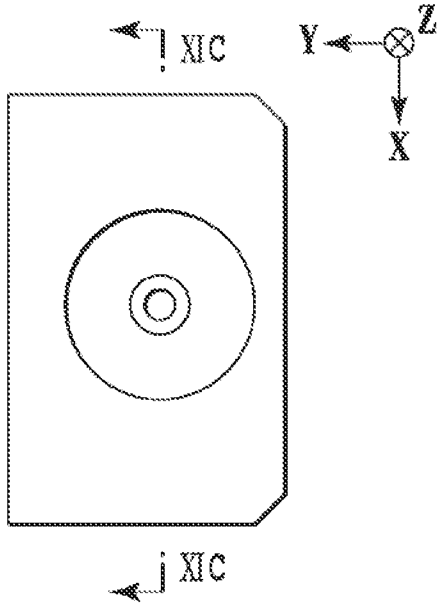
Figure 11C:
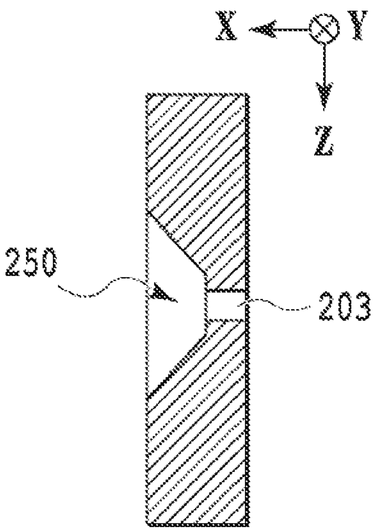

FIGS. 11A to 11C are component diagrams of the first positioning member 231. The first positioning member 231 has the concave portion 250 in the shape of a truncated cone which opens in the liquid ejection direction. Note that the shape of the concave portion 250 may be in the shape of a circular column, a cone, a truncated cone, a pyramid, or a truncated pyramid. It is preferable that the bottom surface of the concave portion does not come into contact with the spherical guide member 901. The spherical guide member 901 is centered at the center of the concave portion of the conical shape described above and brought into abutment, so that the degree of freedom of translation in three directions (X-, Y-, and Z-directions in the drawings) is fixed.

Figure 12A:
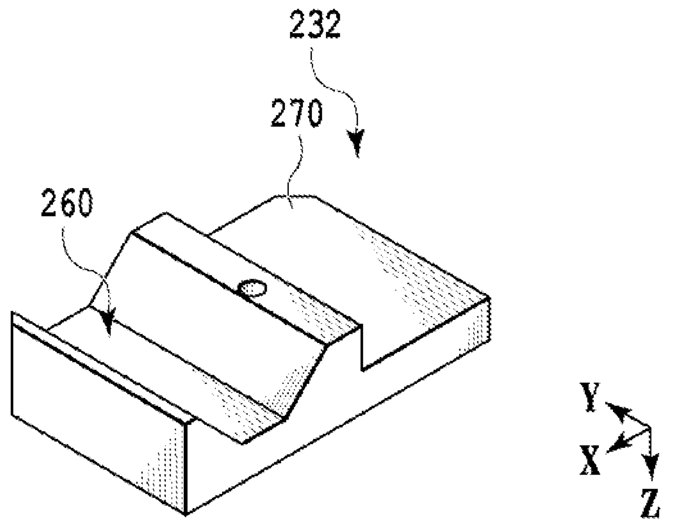
FIGS. 12A to 12C are diagrams of a second positioning member 232, illustrating the third embodiment.
Figure 12B:
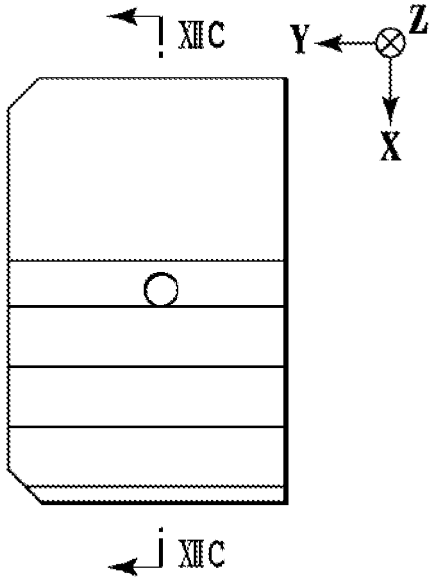
Figure 12C:
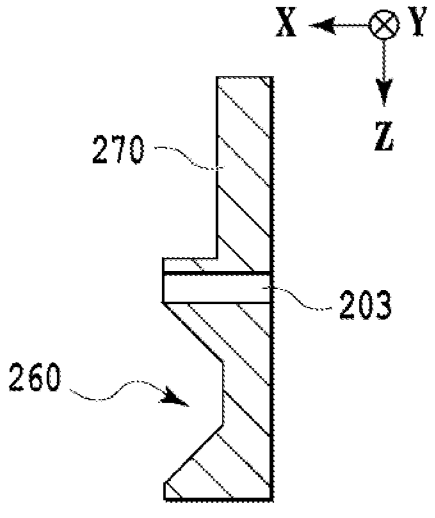

FIGS. 12A to 12C are component diagrams of the second positioning member 232. The second positioning member 232 has the groove portion 260 having a cross section substantially in the shape of the letter V opening in the liquid ejection direction and the flat portion 270 substantially parallel to the print element board 11 in the state where the second positioning member 232 is set at the ejection unit 93. Note that being substantially in the shape of the letter V includes a trapezoidal shape such that a bottom surface is formed at the vertex portion of the letter V. It is preferable that the spherical guide member 901 does not come into contact with the bottom surface of the trapezoidal shape.

Abutment of the spheres 901 with the V-shaped groove 260 described above fixes the degree of freedom of rotation about an axis which is a normal to the surface forming the print element board 11 (rotation about the Z-axis) and rotation about an axis which is a normal to the head's length direction (rotation about the X-axis). Further, the flat portion 270 comes into abutment with another spherical guide member 901. The abutment of the spherical guide member 901 against the flat portion 270 fixes the degree of freedom of rotation about an axis along the head's length direction (rotation about the Y-axis).

The flat portion 270 may be formed in either one of the first positioning member 231 and the second positioning member 232, but in the present embodiment, the flat portion 270 is formed at the second positioning member 232.

The concave portion 250 and the groove portion 260 are shaped so that they fit in the respective spherical guide members 901 by coming into abutment therewith and are as a result at positions where they do not move relative to the spherical guide members 901. The radius of the conical concave portion 250 and the width of the V-shape groove 260 may be any sizes as long as they can come into abutment with the spheres 901 and secured. Too small sizes make them unable to hold the printhead 130, causing wobbling or slanting. Too large sizes, on the other hand, make the spheres 901 unable to be centered properly in a case where the concave portion 250 is conical. Also, too wide a groove 260 makes the spheres 901 unable to be supported by both side surfaces of the groove 260, causing wobbling and slanting.

With the method employed herein, the X- and Y-positions of the printhead 130 are determined at optimal positions only by its own weight and biasing in the Z-direction; thus, there is no need to bias the head in the X- and Y-directions. For this reason, positioning is accomplished only by placing the printhead 130 on the spherical guide members 901 and biasing the printhead 130 in the Z-direction, without needing any positional adjustment after mounting.

The adjustment method is similar to the assemblage method in the first embodiment and is therefore not described here, and the following only describes abutment references used to bring the positioning member into abutment with jigs in assemblage of the positioning member. The jig with which the first positioning member 231 comes into abutment has a sphere with the same diameter as the spherical guide members 901 of the printing apparatus 1300 and determines the position by bringing the sphere into abutment. However, only with the sphere, the first positioning member 231 would slant. Thus, a guide pin is placed to keep the positioning member horizontal. The jig with which the groove portion 260 of the second positioning member 232 comes into abutment uses a shaft with the same diameter as the spherical guide members 901 of the printing apparatus 1300 and thereby can determine the position while performing positional restriction including the slanting of the second positioning member 232. Also, the jig with which the flat portion 270 of the second positioning member 232 comes into abutment can determine the position at a certain height by having an abutment pin disposed at a position corresponding to the position with which the spherical guide member 901 of the printing apparatus is to come into abutment.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-193616, filed Dec. 2, 2022, which is hereby incorporated by reference herein in its entirety.

What is claimed is:

1. A liquid ejection head that ejects liquid, comprising:
a liquid ejection member having a print element board including:
an ejection port surface where an ejection port for ejecting liquid is formed, and
a print element that generates energy for ejecting the liquid from the ejection port;
a positioning member coupled and secured to the liquid ejection member;
adjustment parts for adjusting positions of the positioning member and the liquid ejection member; and
a securing part for coupling and securing the positioning member and the liquid ejection member, wherein
three or more of the adjustment parts are provided for one positioning member, and
the securing part is disposed at a position which is substantially a barycenter of a polygon formed by lines connecting the adjustment parts to one another.

2. The liquid ejection head according to claim 1, wherein the securing part is disposed on or inside of sides of the polygon formed by lines connecting the adjustment parts to one another.

3. The liquid ejection head according to claim 1, wherein the positioning member is provided at each of longitudinal end portions of the liquid ejection member.

4. The liquid ejection head according to claim 1, wherein the adjustment part adjusts a distance between the positioning member and the liquid ejection member in a liquid ejection direction.

5. The liquid ejection head according to claim 1, wherein the liquid ejection head is a full-line-type liquid ejection head.

6. The liquid ejection head according to claim 1, wherein the liquid ejection head is attachable to and detachable from a liquid ejection apparatus, and
upon attachment of the liquid ejection head to the liquid ejection apparatus, the positioning member performs positioning of the liquid ejection apparatus to the liquid ejection head in a liquid ejection direction and in a direction orthogonal to the liquid ejection direction.

7. A liquid ejection head, that ejects liquid, comprising:
a liquid ejection member having a print element board including:
an ejection port surface where an ejection port for ejecting liquid is formed, and
a print element that generates energy for ejecting the liquid from the ejection port;
a positioning member coupled and secured to the liquid ejection member;
an adjustment part for adjusting positions of the positioning member and the liquid ejection member; and
a securing part for coupling and securing the positioning member and the liquid ejection member, wherein
the positioning member has positioning portions formed on a surface facing a same direction as the ejection port surface, the positioning portions being a concave portion, a groove portion, and a flat portion.

8. The liquid ejection head according to claim 7, wherein the concave portion is in a shape of a circular column, a cone, a truncated cone, a pyramid, or a truncated pyramid.

9. The liquid ejection head according to claim 7, wherein the groove portion has a cross section in a shape of a letter V or a trapezoid.

10. A method for manufacturing a liquid ejection head including:

a liquid ejection member having a print element board including:

an ejection port surface where an ejection port for ejecting liquid is formed, and a print element that generates energy for ejecting the liquid from the ejection port;

a positioning member coupled and secured to the liquid ejection member;

an adjustment part for adjusting positions of the positioning member and the liquid ejection member; and a securing part for coupling and securing the positioning member and the liquid ejection member, the method using an apparatus including:

an abutment member jig with which to bring the positioning member into abutment, a camera capable of recognizing a position of the liquid ejection member, a stage capable of moving the liquid ejection member, and a fixture that secures the liquid ejection member onto the stage, the method comprising:

pre-defining the abutment member jig and a target position in the camera at proper positions;

disposing the positioning member by bringing the positioning member into abutment with the abutment member jig;

securing the liquid ejection member onto the stage;

making a positional adjustment of the liquid ejection member to the target position in the camera by moving the stage;

after the positional adjustment, inserting the adjustment part through the liquid ejection member and bringing the adjustment part into abutment with the positioning member; and coupling and securing the liquid ejection member and the positioning member using the securing part.

11. A liquid ejection apparatus including a detachable liquid ejection head, wherein the liquid ejection head comprises:

a liquid ejection member having a print element board including:

an ejection port surface where an ejection port for ejecting liquid is formed, and a print element that generates energy for ejecting the liquid from the ejection port, a positioning member coupled and secured to the liquid ejection member, adjustment parts for adjusting positions of the positioning member and the liquid ejection member, and a securing part for coupling and securing the positioning member and the liquid ejection member, three or more of the adjustment parts are provided for one positioning member, the securing part is disposed at a position which is substantially a barycenter of a polygon formed by lines connecting the adjustment parts to one another, and in a case of attachment of the liquid ejection head to the liquid ejection apparatus, the positioning member performs positioning of the liquid ejection apparatus to the liquid ejection head in a liquid ejection direction and in a direction orthogonal to the liquid ejection direction.

* * * * *